United States Patent [19]

Kash

[11] 3,886,366
[45] May 27, 1975

[54] COMPTON BACK-SCATTERED RADIATION SOURCE

[75] Inventor: Sidney W. Kash, Manhattan Beach, Calif.

[73] Assignee: The United States of America as represented by the Secretary of the Air Force, Washington, D.C.

[22] Filed: Apr. 13, 1973

[21] Appl. No.: 350,855

[52] U.S. Cl............................ 250/493; 331/94.5 A
[51] Int. Cl. ............................................ H01j 37/00
[58] Field of Search................ 250/493; 331/94.5 A

[56] References Cited
UNITED STATES PATENTS
3,482,254 12/1969 Harrison et al.................... 331/94.5
3,560,258 2/1971 Brisbane............................. 331/94.5
3,599,106 8/1971 Snitzer................................ 331/94.5

OTHER PUBLICATIONS

"Producing A γ-Quantum Beam by the Compton Effect with Relativistic Electrons," by O. F. Kulikov et al., from Instruments and Experimental Techniques, No. 4, July–August, 1967, pages 710–714.

*Primary Examiner*—James W. Lawrence
*Assistant Examiner*—C. E. Church
*Attorney, Agent, or Firm*—William Stepanishen

[57] ABSTRACT

An apparatus utilizing the Compton back-scattered technique to produce an intense unidirectional pulsed source of low-energy X-rays. The X-rays are produced by the Compton back-scattering of a beam of low-energy photons with an oppositely-directed, high-energy, high-intensity electron beam.

3 Claims, 3 Drawing Figures

COMPTON BACK-SCATTERED RADIATION SOURCE

BACKGROUND OF THE INVENTION

The present invention relates broadly to Compton back-scattered radiation source and in particular to an apparatus for producing low-energy X-rays having variable energy.

The existing prior art devices include among others, low-impedance flash X-ray machines and plasma acceleration and compression machines which have cylindrical as well as other geometries. These existing prior state-of-the-art devices currently are capable of providing isotropic radiation sources. The energy levels which may be obtained from these prior art isotropic radiation sources are relatively low, since these devices are capable only of several joules each.

There are other prior art devices which are capable of providing X-rays, such as, the laser-heated microparticles and heated small particles of fusionalbe materials. These devices presently are not capable of being effectively utilized to provide X-ray sources which are capable of several tens to several hundred joules of isotropic radiation. Further, the present prior art devices do not satisfy the requirement of providing a highly collimated radiation source thereby simplifying the problem of the extraction of the radiation in order to perform useful experimentation. All the existing prior art devices and proposed X-Ray sources provide a bremsstrahlung type of spectral distribution in which the spectral intensity varies inversely with the photon energy, or has a broad thermal peak below the maximum energy. The present invention, however, by utilizing the Compton back-scattering technique will provide a spectrum whose intensity is at a maximum at its energy maximum. In addition, while the other prior art X-radiation sources contain various impurity radiations which depend upon the materials utilized, the present invention energy distribution is free of impurity radiations and may be precisely determined by the original energies of the electrons and the incident laser photons which are utilized.

SUMMARY OF THE INVENTION

The present invention utilizes a Compton Back-Scattered Radiation Source for providing an intense uni-directional pulsed laboratory source of low-energy X-rays of controllable energy. The X-rays are produced by the Compton back-scattering of a beam of low-energy photons which is produced by a laser amplification system, with an oppositely-directed high-energy, high-intensity electron beam which is obtained from a high-energy electron-beam machine. When the electron and the photon meet in the interaction region, the photon is back-scattered off the electron. The energy of the photon will be greatly increased and highly collimated in the direction of the electron beam. In order to prevent the electrons after interaction with the photons from striking the target, the electrons are deflected from the target area by the use of a transverse magnetic field.

It is one object of the invention, therefore, to provide an improved Compton back-scattered radiation apparatus to provide an intense unidirectional pulsed radiation source of low-energy X-rays.

It is another object of the invention to provide an improved X-ray radiation apparatus having a highly collimated radiation source thereby simplifying the extraction of the required radiation.

It is yet another object of the invention to provide an improved X-ray radiation apparatus having an emitted radiation wavelength which can be controlled by changing the input laser wavelength and/or by varying the electron voltage of the electron beam machine.

It is still another object of the invention to provide an improved X-ray radiation apparatus having a spectrum whose intensity is maximum at its energy maximum, which is precisely determined by the original energies of the electrons and the incident laser photons.

These and other advantages, objects and features of the invention will become more apparent from the following detailed description when taken in conjunction with the illustrative embodiments in the accompanying drawings.

DESCRIPTION OF THE PREFERRED EMBODIMENT

Figure 1:
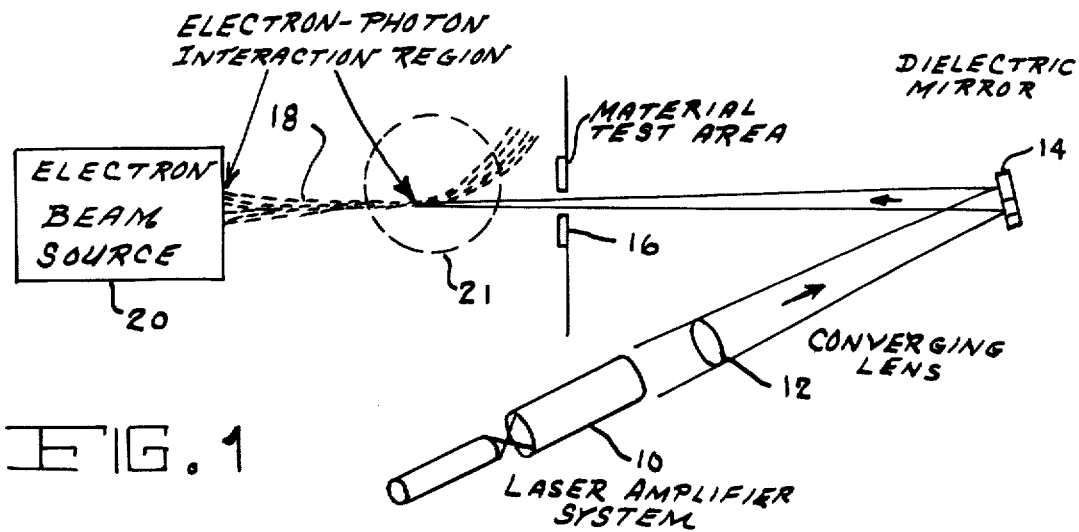
FIG. 1 is a schematic diagram of the Compton back-scattered radiation apparatus in accordance with this embodiment.

Referring now to FIG. 1, there is shown a general schematic of the Compton back-scattered radiation apparatus utilizing a laser amplifier system 10 to provide the desired laser beam. The laser beam which is produced in laser amplifier system 10 is focused by the long-focus converging lens 12. Upon being reflected from the dielectric mirror 14 at an angle equal to the angle of incidence, the laser beam passes through an opening in the target area 16 in its journey toward the electron-photon interaction region 18. The interaction region 18 is the volume of space in front of the electron source 20 wherein the electrons are brought out. The laser beam is brought into focus in that region and adjusted to maximize the number of head-on collisions between photons and electrons. A high-energy electron-beam machine or source 20 provides a high-intensity electron beam which is directed counter to the direction of the laser beam. When the high-energy electron beam from the electron-beam source 20 is in collision with the beam of low-energy photons in the interaction region 18, the photon is back-scattered by the electron beam. Thus, the energy of the photons is substantially increased and they are focused into a highly collimated beam. The electrons, after interacting with the photons are deflected from the target area 16 by use of a deflecting magnet 21 with pole pieces transverse to the electron beam.

The electron beam source 20 is a conventional apparatus which is commercially available from Physics International in San Leandro, Calf., and ION Physics Corporation in Burlington, Mass. These companies both use the term flash X-ray with respect to their devices that produce either electron beams or X-rays. Physics International Corp. has three machines models No. 312, 738, and 1140 which may produce either an X-ray output or an electron beam output. ION Physics Corp. manufactures the FX-25 super flash X-ray machine which also has the capability of operating in either the electron or the X-ray mode. Historically, these devices were first designed to produce intense bursts of high energy X-rays, by the impingement of a pulse of energetic electrons on a metal anode plate. The term flash was used to designate the pulsed mode of operation as opposed to the steady state mode. In later developments, the anode was redesigned to permit the electron beam pulse to be brought out directly from the machine. In the present invention, the electron beam source may be a "flash X-ray machine" from either of the above-mentioned manufacturers which is operated in the electron beam mode, or a Hermes or Aurora type machine hereinbelow described.

OPERATING PRINCIPLES

When a low-energy photon is back-scattered off a relativistic electron, its energy will be greatly increased. The maximum energy transferred will occur when the electron and photon meet initially head on and the photon is scattered back in the direction of the original electron motion. Let E = energy of electron (MeV)
$E_1$ = energy of incident photon (MeV)
$E_2$ = energy of scattered photon (MeV)
$\theta_1, \theta_2$ = angles of incident and scattered photon relative to moving electron direction
$\theta$ = angle between incident and scattered photons
$E_o = m_o c^2$ = rest energy of electron = 0.51 MeV
P = initial electron momentum
c = velocity of light Thus the energy of the back-scattered photon is given by the Compton relationship:

$$\frac{E_2}{E_1} = \frac{E - pc \cos \theta_1}{E - pc \cos \theta_2 + E_1(1 - \cos \theta)} \quad \text{(Eq. 1)}$$

When the photon is of optical energy (~$10^{-6}$ MeV) and the electon energy is of the order of several MeV, the second term in the denominator may be neglected. Furthermore, the following approximation is valid:

$$pc/E = 1 - \frac{1}{2}(E_o/E)^2 \quad \text{(Eq. 2)}$$

For a head on collision ($\theta_1 = \pi$), in which the photon is back-scattered nearly along the direction of the electron motion (i.e., $\theta_2$ is small), we have approximately $$\frac{E_2}{E_1} = \frac{4}{(E_o/E)hu\,2 + \theta_2^2} \quad \text{(Eq. 3)}$$

The maximum photon energy will occur for $\theta_2 = 0$:

$$E_2(\text{max})/E_1 = 4(E/E_o)^2 = 15.3\ E^2 \quad \text{(Eq. 4)}$$

For example, for a 10-MeV electron ($E = E_{kin} + E_o = 10.5$ MeV), $E_2(\text{max})/E_1 = 1700$.

From equations (3) and (4) we obtain $$\frac{E_2}{E_2(\text{max})} = \frac{(E_o/E)^2}{(E_o/E)^2 + \theta_2^2} \quad \text{(Eq. 5)}$$

Figure 2:
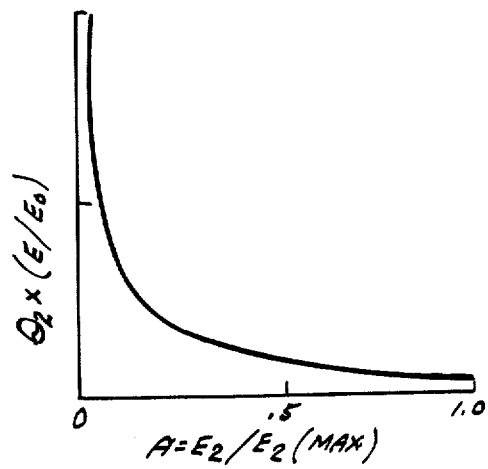
FIG. 2 is a graphic representation of the variation of the scattering angle with photon energy.

It may be seen that $E_2/E_2(\text{max})$ will decrease rapidly as the photon direction departs from $\theta_2 = 0$. For example $E_2$ will fall to $\frac{1}{2} E_2(\text{max})$ for $\theta_2 = E_o/E$. In the example of a 10-MeV electron, this will occur for $\theta_2$ equal about 0.05 radian. It may be concluded therefore, that only photons scattered close to the direction of the electron beam direction will be hardened by the back-scattering process. A plot of $\theta_2$ vs $E_2$ is shown in FIG. 2.

The number of photons actually scattered in a given direction is given by the Klein-Nishina differential scattering cross-section. For the case at hand, this reduces to the following simple expression:

$$d\sigma = 4\pi r_o^2 [(1-A)^2 + A^2]\ dA \quad \text{(Eq. 6)}$$

where $r_o$ is the classical electron radius (=$2.82 \times 10^{-13}$ cm), and $$A = E_2/E_2(\text{max}) \quad \text{(Eq. 7)}$$

Figure 3:
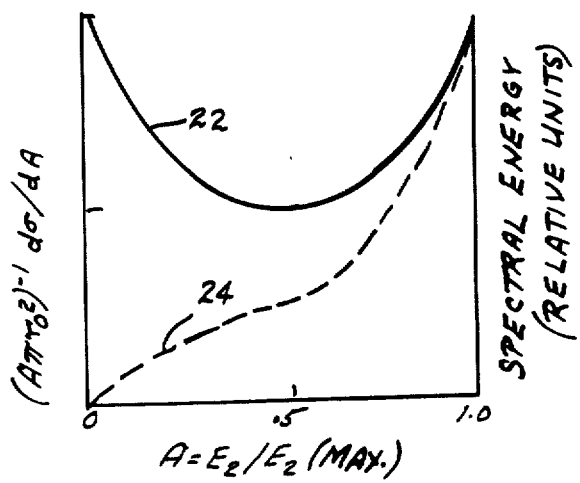
FIG. 3 is a graphic representation of the variation of the number of photons scattered with photon energy.

The energy distribution of the scattered photons (solid curve 22) is shown in FIG. 3. The total scattering cross-section which is obtained by integrating equation (6) over A from 0 to 1, is equal to the Thomson scattering cross section:

$$\sigma = (8/3)\pi r_o^2 = 0.665 \times 10^{-24}\ \text{cm}^2 \quad \text{(Eq. 8)}$$

(For electron energies in the GeV region, $E_2(\text{max})$ approaches $E$ and $\sigma$ is less than the value shown.) The relative spectral intensity (dotted curve 24) which is obtained by multiplying equation (6) by $E_2$, is also shown in FIG. 3. It may be seen that this peaks at $E_2(\text{max})$, and is quite different from the $1/E$ bremsstrahlung spectrum. Since the cross-section is symmetrical about $A = 0.5$, the mean photon energy is 0.5 $E_2(\text{max})$. However, most of the spectral energy is above this, and the average spectral energy is about ($\frac{3}{4}$) $E_2(\text{max})$.

After the interaction region 18 it is necessary to deflect the electrons from striking the targets 16 under study. This may be readily accomplished with a transverse magnetic field 21. Assume a deflection angle of 0.2 radians (more than adequate) in a distance of 10 cm is required. This therefore requires a cyclotron turning radius R of about 50 cm. Since the velocity of the electrons is approximately the velocity of light $c$, the magnetic field required is $$B \approx \frac{mc^2}{eR} = \frac{E}{eR} = 670\ \text{gauss}$$

This is a modest magnetic field for laboratory apparatus.

The largest electron beam generators available at present are the Hermes II at Sandia and the planned Aurora machine. Their characteristics are:

|  | Beam Voltage | Beam Current | Pulse Length |
|---|---|---|---|
| Aurora: | 10 MeV | 700 kA | 100 nsec |
| Hermes: | 13 MeV | 200 kA | 70 nsec |

The larger voltage of the Hermes gives a larger ratio of $E_2(\text{max})/E_1$ than the Aurora (2800 vs 1700), but this is offset by the larger current of the Aurora. Therefore, the Aurora characteristics will be used in the present analysis.

The most energetic short-pulse laser systems at present employ neodymium glass systems. Laser amplification is obtained by using several glass rods, either similar size rods in parallel or tandem rods of increasing diameter. The characteristics of a 5 amplifier CGE (France) system are as follows:

Wavelength: 1.06 $\mu$  Beam energy: 250 J
Pulse length: 6 ns  Beam divergence: $1.2 \times 10^{-3}$ radians The photon energy for this system is equivalent to $E_1 = 1.17 \times 10^{-6}$ MeV. The pulse length is unimportant, since it is much smaller than that of the electron beams described. (However, the use of a substantially longer-pulse, more energetic beam would be advantageous.) The maximum energy increase of a photon scattered off the electron beam is $$E_2(\text{max})/E_1 = (15.3)(10.0 + 0.5)^2 = 1700$$

For $E_1 = 1.17 \times 10^{-6}$ MeV, $E_2(\text{max})$ will be approximately 2 keV. The average scattered photon energy would be one-half of this or 1 keV, but the spectral average is about 1.5 keV.

In order to determine the overall scattering probability for each photon, the number of electrons in its path must be estimated. Assuming the Aurora is operated in a pinch mode or a charge imaging cylinder is used to restrict the beam to a diameter of about 0.1 cm, the current density is given by $$700 \text{ kA}/10^{-2} \text{ cm}^2 = 7 \times 10^7 \text{ amp/cm}^2 = 4.4 \times 10^{26}$$
electron/cm² · sec Assume that the beam length available is approximately 10 cm. (This may be in several segments and will require optimization of gas pressure, confining magnetic fields, and/or imaging tubes.) For relativistic electrons, 10 cm. requires a transit time of $^- \times 10^{-9}$ second. The number of electrons that each photon would thus "see" is, with a factor 2 taking into account the electron motion, $$(4.4 \times 10^{26})(2 \times \tfrac{1}{3} \times 10^{-9}) \times 2.9 \times 10^{17} \text{ electron/cm}^2$$

Since by formula (8) the total scattering cross-section for each electron equals $0.67 \times 10^{-24}$ cm², the overall scattering probability is $$(2.9 \times 10^{17})(0.67 \times 10^{24}) \times 1.9 \times 10^{-7}$$

The total energy in the Compton back-scattered (CBS) photon beam is thus given by photon energy in laser beam × scattering probability × average photon energy multiplication
= (250 J)(1.9 × 10⁻⁷)(850) = 0.04J Now this appears as a fairly small amount of energy. However, it is restricted to a very small conical region of half-angle which is given by $$\theta_2 \approx E_0/E = 0.05 \text{ radian}$$

The associated solid angle is $$\Omega_2 = 2\pi(1 - \cos\theta_2) \approx \pi\theta_2^2$$

Insofar as X-rays per steradian, the CBS source is equivalent approximately to an isotropic source $4/\theta_2^2$ as large. This is a factor of about 1700. The CBS source is thus roughly the equivalent of a 70-joule isotropic source of maximum energy 2 keV and spectral average energy of about 1.5 keV. Even allowing for only 30 percent efficiency in spatially overlapping the laser and electron beams, one still has the equivalent of about 20-J isotropic source.

The performance analysis above for the CBS source is obtainable with existing systems. A number of improvements may be readily visualized. Improvements in the electron beam and laser beam systems can be taken advantage of for the CBS source. An increase in the electron beam voltage by a factor of $\pi$ will increase the individual scattered photon energy multiplication (and thus the overall energy back scattered) by a factor of about 10. It will simultaneously narrow the solid angle by an equal factor. An increase in the current density by using more stored energy or by reducing the pulse time or beam cross section, and an increase in the interaction path length provides the potential for another factor of 10. Increasing the energy in the laser beam will provide a corresponding increase in the output of the CBS source. Increasing the laser frequency, e.g., utilizing a ruby laser system at 1.78 eV, will produce a proportionate increase in the spectral content of the X-ray beam.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. A Compton back-scattered radiation apparatus comprising in combination:
   a laser amplifier system for producing an intense laser beam of optical photons;
   a converging lens positioned in said laser beam's path to focus said laser beam;
   a dielectric mirror positioned to reflect said laser beam at an angle equal to the angle of incidence;
   an electron beam source for producing a high-energy high-intensity relativistic, electron beam, said electron beam being directed counter to the direction of said laser beam and intersecting said laser beam along its path length;
   an interaction region positioned between said electron beam source and said dielectric mirror, said electron beam being in collision with said laser beam within said interaction region, said laser beam photons being increased in energy by being back-scattered by said electron beam and
   a target positioned between said interaction region and said dielectric mirror to receive said backscattered laser beam photons, said target having an opening therein; said opening being positioned to allow passage of said reflected laser beam toward said interaction region.

2. A Compton back-scattered radiation apparatus as described in claim 1 further including:
an electron deflecting magnet positioned between said target and said interaction region, said magnet deflecting said electrons after interaction with said laser beam and preventing said electrons from striking said target.

3. A Compton back-scattered radiation apparatus as described in claim 2 wherein said electron deflection magnet is oriented to provide a transverse magnetic field, said transverse magnetic field prevents said electrons from striking said target.

* * * * *